United States Patent
Yamaguchi et al.

(10) Patent No.: US 8,571,130 B2
(45) Date of Patent: Oct. 29, 2013

(54) TRANSMITTING APPARATUS AND TRANSMISSION METHOD

(75) Inventors: Satoru Yamaguchi, Nagoya (JP); Daisuke Yamada, Nagoya (JP); Nagahiro Matsuura, Nagoya (JP); Hiroshi Katano, Nagoya (JP); Masato Kato, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 210 days.

(21) Appl. No.: 13/173,458

(22) Filed: Jun. 30, 2011

(65) Prior Publication Data

US 2012/0005553 A1    Jan. 5, 2012

(30) Foreign Application Priority Data

Jun. 30, 2010 (JP) ................................ 2010-150533

(51) Int. Cl.
*H04L 1/02*    (2006.01)
(52) U.S. Cl.
USPC ........... 375/267; 714/751; 714/752; 714/758; 714/757; 714/776; 714/802; 714/808; 714/807; 375/260; 375/299; 375/138; 370/334; 370/345; 370/242

(58) Field of Classification Search
None
See application file for complete search history.

(56) References Cited

U.S. PATENT DOCUMENTS

| | | | | |
|---|---|---|---|---|
| 8,155,098 | B2 * | 4/2012 | Huang et al. | 370/343 |
| 2002/0154705 | A1 * | 10/2002 | Walton et al. | 375/267 |
| 2006/0013330 | A1 * | 1/2006 | Ha | 375/267 |
| 2006/0018247 | A1 * | 1/2006 | Driesen et al. | 370/208 |
| 2007/0286149 | A1 * | 12/2007 | Yamamoto et al. | 370/345 |
| 2008/0056140 | A1 * | 3/2008 | Shida et al. | 370/242 |
| 2010/0165931 | A1 * | 7/2010 | Nimbalker et al. | 370/329 |
| 2010/0302991 | A1 * | 12/2010 | Jalali et al. | 370/313 |
| 2010/0303004 | A1 * | 12/2010 | Mueck et al. | 370/328 |
| 2011/0013616 | A1 * | 1/2011 | Fischer et al. | 370/344 |
| 2011/0161785 | A1 * | 6/2011 | Pyndiah et al. | 714/776 |

FOREIGN PATENT DOCUMENTS

| | | | |
|---|---|---|---|
| JP | 2004-320434 A | | 11/2004 |
| JP | 2009-060223 | * | 3/2009 |
| JP | 2009-60223 | | 3/2009 |

OTHER PUBLICATIONS

U.S. Appl. No. 13/302,478, filed Nov. 22, 2011, Yamada.
"Part 11: Wireless LAN Medium Access Control (MAC) and Physical Layer (PHY) Specifications; Amendment 5: Enhancements for Higher Throughput", IEEE Standard for Information Technology-Telecommunications and Information Exchange Between Systems—Local and Metropolitan Area Networks—Specific Requirements, IEEE Std 802.11n, Oct. 29, 2009, 535 Pages.
Japanese Office Action issued Sep. 18, 2012, in Japan Patent Application No. 2010-150533 (with English translation).
Office Action issued Mar. 5, 2013 in Japanese Patent Application No. 2010-150533 with English language translation.

* cited by examiner

*Primary Examiner* — John Trimmings
(74) *Attorney, Agent, or Firm* — Oblon, Spivak, McClelland, Maier & Neustadt, L.L.P.

(57) ABSTRACT

A transmitting apparatus for transmitting user data, includes: an establishing section that establishes three or more transmission paths for a receiving apparatus; a first generation section that generates a user data unit which includes user data to be transmitted to the receiving apparatus; and a second generation section that generates an error correction data unit which includes error correction data to be used for error correction of the user data to be transmitted to the receiving apparatus. At least one of the three or more transmission paths transmits the error correction data unit, and at least two of the three or more transmission paths transmits the user data unit.

7 Claims, 7 Drawing Sheets

TRANSMITTING APPARATUS AND TRANSMISSION METHOD

BACKGROUND OF THE INVENTION

1. Field of the Invention

This invention relates to a transmitting apparatus and a transmission method for transmitting user data.

2. Description of the Related Art

In recent years, multiple input multiple output (MIMO) technology has been attracting attention as a technique to increase transmission rate (refer to, for example IEEE 802.11n "Part 11; Wireless LAN Medium Access Control (MAC) and Physical Layer (PHY) Specification" Oct. 29, 2009). To be more concrete, the MIMO technology allows transmission of different data sets to a user terminal respectively from multiple antennas. Thus, it is possible to increase transmission capacity and to improve transmission reliability.

In the meantime, the reachability of the user data may degrade because transmission or reception of the user data may fail due to a factor such as a dead spot or change in the characteristics of transmission path.

As techniques to enhance the reachability of the user data, there are known a technique that performs retransmission control of user data, a technique that decreases the transmission rate of user data by use of adaptive modulation control, and the like.

However, the retransmission control of user data causes a decrease in the throughput due to retransmission delay, while the adaptive modulation control causes a decrease in the throughput due to a decrease in the transmission rate. Accordingly, the technique to increase the reachability of user data still has room for improvement.

In this respect, this invention has been made to solve the aforementioned problems, and the objective of the present invention is to provide a transmitting apparatus and a transmission method each of which is capable of increasing the reachability of user data.

SUMMARY OF THE INVENTION

A first feature of a transmitting apparatus (transmitting apparatus 10) for transmitting user data, includes: an establishing section (establishing section 16) that establishes three or more transmission paths for a receiving apparatus (receiving apparatus 20); a first generation section (user data unit generation section 13) that generates a user data unit which includes user data to be transmitted to the receiving apparatus; and a second generation section (error correction data unit generation section 14) that generates an error correction data unit which includes error correction data to be used for error correction of the user data to be transmitted to the receiving apparatus. At least one of the three or more transmission paths transmits the error correction data unit, and at least two of the three or more transmission paths transmits the user data unit.

In the first feature, the transmitting apparatus includes a third generation section (aggregated data unit generation section 15) that generates an aggregated data unit which includes plural data units. The aggregated data unit includes configuration data which indicates a configuration of data to be transmitted to the receiving apparatus through the three or more transmission paths.

In the first feature, the transmission path which transmits the error correction data unit is unchanged and fixed over predetermined time intervals.

In the first feature, the error correction data units are transmitted through different transmission path at a predetermined time interval in a path hopping manner.

In the first feature, the error correction data includes first error correction data to be used for error correction of the user data to be transmitted to the receiving apparatus, and second error correction data to be used for error correction of the user data to be transmitted to the receiving apparatus. The transmission path for transmitting the error correction data unit includes a transmission path for transmitting an error correction data unit including the first error correction data, and a transmission path for transmitting an error correction data unit including the second error correction data. The first error correction data is generated by a method different from a method used for generating the second error correction data.

In the first feature, the establishing section establishes the three or more transmission paths for each of plural receiving apparatuses. Error correction data transmission methods applied to user data to be transmitted to the respective plural receiving apparatuses are different from one another.

A second feature of a transmission method for transmitting user data, includes a step A of establishing three or more transmission paths for a receiving apparatus; a step B of generating a user data unit which is a data unit including user data to be transmitted to the receiving apparatus; and a step C of generating an error correction data unit which is a data unit including error correction data to be used for error correction of the user data to be transmitted to the receiving apparatus. At least one of the three or more transmission paths is a transmission path for transmitting the error correction data unit, and at least two of the three or more transmission paths are transmission paths for transmitting the user data unit.

DESCRIPTION OF THE EMBODIMENTS

Figure 1:
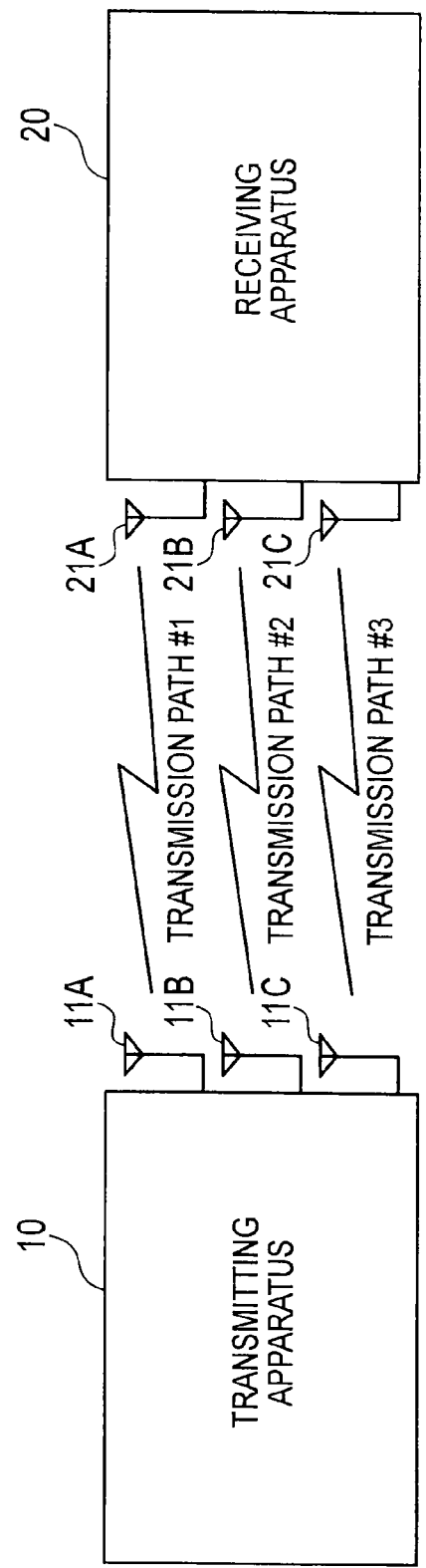
FIG. 1 shows a configuration of a network according to a first embodiment.

Next a transmitting apparatus according to an embodiment of this invention is described with reference to the drawings. In the drawings, the same or similar components are labeled with the same or similar reference numerals.

It should be noted that the drawings are simplified representations of the actual constitution, and that dimensions of parts are different from actual ones. Accordingly, actual dimensions should be interpreted according to the following description. Further, it should also be understood that the same part may be different in size in different drawings.

[Overview of Embodiment]

A transmitting apparatus for transmitting user data, includes: an establishing section that establishes three or more transmission paths for a receiving apparatus; a first generation section that generates a user data unit which includes user data to be transmitted to the receiving apparatus; and a second generation section that generates an error correction data unit which includes error correction data to be used for error correction of the user data to be transmitted to the receiving apparatus. At least one of the three or more transmission paths transmits the error correction data unit, and at least two of the three or more transmission paths transmit the user data unit.

In the embodiment, the transmitting apparatus transmits the error correction data unit through at least one of the three or more transmission paths. Accordingly, the reachability of the user data may be enhanced.

In addition, the transmitting apparatus transmits the user data unit through at least two of the three or more transmission paths. Accordingly, even if the transmission path for transmitting the error correction data unit is introduced, it is possible to suppress a significant decrease in the transmission rate of the user data.

First Embodiment (Configuration of Network)

Hereinafter, a description will be given to a configuration of a network according to the first embodiment with reference to the drawing. FIG. 1 shows the configuration of the network according to the first embodiment.

As shown in FIG. 1, the network includes the transmitting apparatus 10 and a receiving apparatus 20. The transmitting apparatus 10 transmits user data to the receiving apparatus 20. Note that, the transmitting apparatus 10 has plural antennas 11 (antennas 11A to 11C). The receiving apparatus 20 has plural antennas 21 (antennas 21A to 21C).

Here, the MIMO technology is used in the first embodiment. To be more concrete, the plural antennas 11 of the transmitting apparatus 10 transmit data to the plural antennas 21 of the receiving apparatus 20, respectively. A transmission path #1 is established between the antenna 11A and the antenna 21A, a transmission path #2 is established between the antenna 11B and the antenna 21B, and a transmission path #3 is established between the antenna 11C and the antenna 21C, for example.

(Configuration of Transmitting Apparatus)

Figure 2:
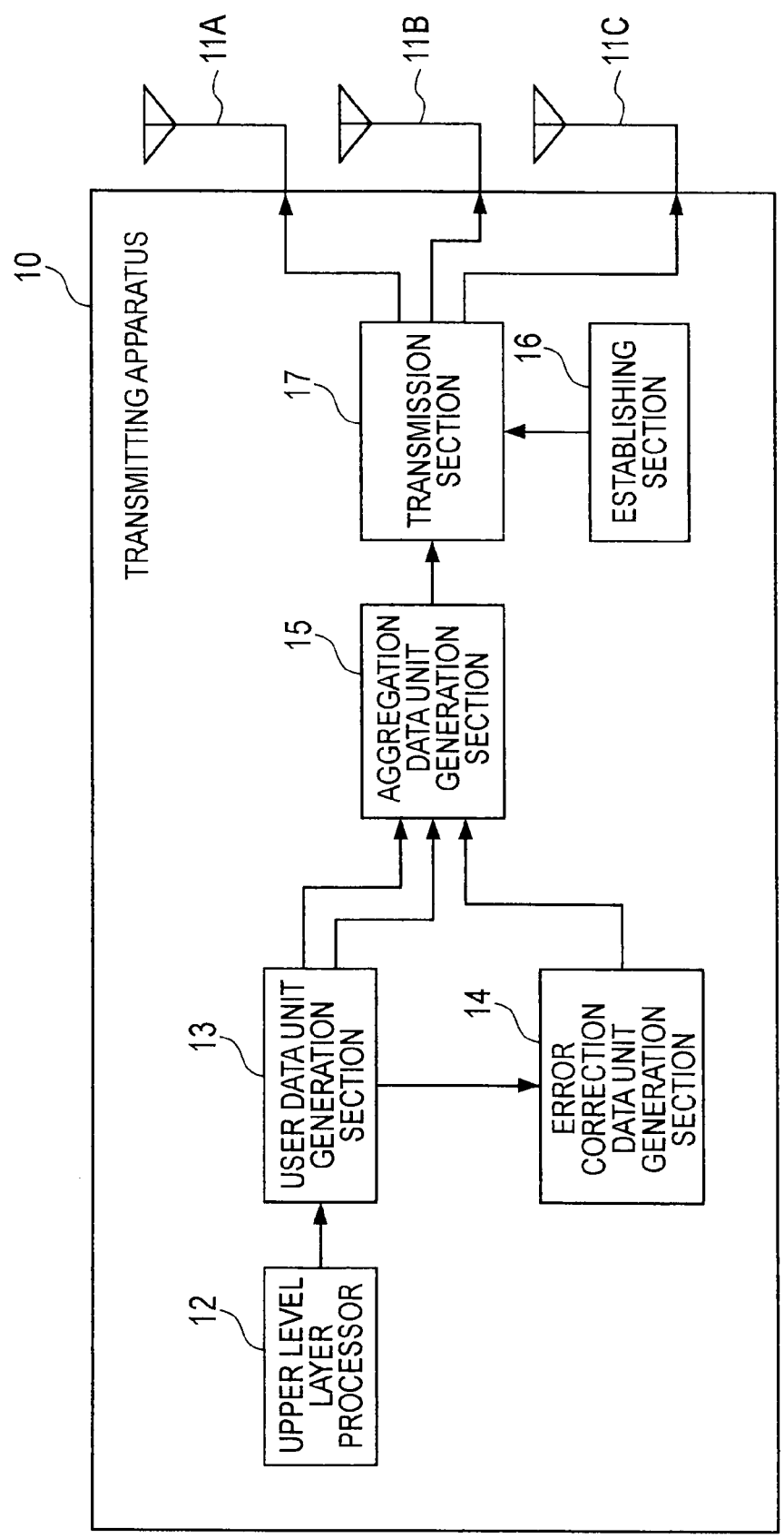
FIG. 2 is a block diagram showing a transmitting apparatus 10 according to the first embodiment.

FIG. 2 is a block diagram showing the transmitting apparatus 10 according to the first embodiment. Note that, a description will be primarily given to a media access control (MAC) layer in the first embodiment.

As shown in FIG. 2, the transmitting apparatus 10 includes the plural antennas 11 (antennas 11A to 11C), an upper level layer processor 12, a user data unit generation section 13, an error correction data unit generation section 14, an aggregated data unit generation section 15, an establishing section 16 and a transmission section 17.

The upper level layer processor 12 processes data of an upper level layer (logical link control (LLC) layer, for example) provided at a level higher than the MAC layer. The upper level layer processor 12 outputs a service data unit including user data to the user data unit generation section 13. Here, the service data unit is a MAC service data unit (MSDU) for example.

The user data unit generation section 13 reconstruct the service data unit to generate a protocol data unit including user data (hereinafter, referred to as a user data unit). The user data unit generation section 13 processes data of the MAC layer, for example. The protocol data unit is a MAC protocol data unit (MPDU) for example.

Here, the user data unit generation section 13 generates at least two streams of user data units in accordance with the number of transmission paths for transmitting the user data units among the transmission paths established between the transmitting apparatus 10 and the receiving apparatus 20.

The error correction data unit generation section 14 generates a protocol data unit including error correction data to be used for error correction of user data (hereinafter, referred to as an error correction data unit). The protocol data unit is a MAC protocol data unit (MPDU) for example.

Here, the user data unit generation section 13 generates one or more streams of error correction data units in accordance with the number of transmission paths for transmitting the error correction data unit among the transmission paths established between the transmitting apparatus 10 and the receiving apparatus 20.

Here, the error correction data may be exclusive OR (parity data) of bits forming at least two streams of user data units, for example. Alternatively, the error correction data may be exclusive OR (parity data) of bits forming error correcting codes generated by a Hamming code or Reed-Solomon code respectively for the at least two streams of user data units. Note that, the parity data may be horizontal parity data, vertical parity data, or diagonal parity data.

The aggregated data unit generation section 15 generates an aggregated data unit formed of plural protocol data units. To be more concrete, the aggregated data unit generation section 15 generates plural streams of aggregated data units respectively for the transmission paths established between the transmitting apparatus 10 and the receiving apparatus 20. The aggregated data unit is an aggregation MAC protocol data unit (A-MPDU), for example.

Here, the aggregated data unit generation section 15 generates an aggregated data unit to be transmitted through one transmission path by using plural protocol data units to be transmitted through the one transmission path. To put it another way, the aggregated data unit generation section 15 generates an aggregated data unit including user data units without including an error correction data unit. Alternatively, the aggregated data unit generation section 15 generates an aggregated data unit including an error correction data unit without including any user data units.

In the first embodiment, the aggregated data unit generation section 15 inserts configuration data indicating the configuration of data to be transmitted to the single receiving apparatus 20 through plural transmission paths into an aggregated data unit. The aggregated data unit generation section 15, for example, newly generates a protocol data unit (MPDU) including the configuration data and then inserts the protocol data unit including the configuration data into an aggregated data unit.

Here, the following are examples of the configuration data: (1) data indicating whether or not plural transmission paths established for the single receiving apparatus 20 include a transmission path for transmitting an error correction data unit; (2) data indicating which of a user data unit and an error correction data unit is included in the aggregated data unit; (3) data indicating the total number of transmission paths established for the single receiving apparatus 20; (4) data identifying the transmission path for transmitting configuration data among plural transmission paths established for the single receiving apparatus 20; (5) data indicating the data length of user data units in an aggregated data unit including configuration data; (6) data indicating the number of transmission paths for transmitting user data units in addition to (2) and (3) described above; (7) data indicating the number of transmission paths for transmitting an error correction data unit in addition to (2) and (3) described above; (8) data indicating whether or not a transmission path for transmitting an error correction data unit is fixed (to put it another way, whether or not the error correction data unit is dispersedly transmitted through transmission paths); (9) data indicating the unit time for switching the transmission path for transmitting an error correction data unit to another transmission path in the case where the error correction data unit is dispersedly transmitted through the transmission paths; (10) data indicating the unit number of MPDUs for switching the transmission path for transmitting an error correction data unit to another transmission path (increment of sequence control (number) of the user data units, for example) in the case where the error correction data unit is dispersedly transmitted through the transmission paths; (11) data indicating the unit number of A-MPDUs for switching the transmission path for transmitting an error correction data unit to another transmission path in the case where the error correction data unit is dispersedly transmitted through the transmission paths; (12) data indicating the type of an error correction data included in an error correction data unit (parity type, for example); (13) data indicating the sequence control (number) of user data units to be corrected by the error correction data unit, in addition to (10) described above; and (14) data indicating switching sequence for the transmission paths for transmitting an error correction data unit (transmission path#1-> transmission path #2-> transmission path #3->transmission path #1 or the like, for example) in the case where the error correction data unit is dispersedly transmitted through the transmission paths.

The establishing section 16 establishes three or more transmission paths for the single receiving apparatus 20. It is a matter of course that the number of transmission paths that can be established for the single receiving apparatus 20 depends on the number of antennas provided to the transmitting apparatus 10 and the receiving apparatus 20.

The transmission section 17 transmits an aggregated data unit generated by the aggregated data unit generation section 15. To be more concrete, the transmission section 17 transmits the aggregated data unit generated for each of the antennas (transmission paths) 11, by use of the respective antennas 11.

Here, the transmission section 17 may make the transmission path for transmitting an error correction data unit unchanged and fixed over predetermined time intervals. Alternatively, the transmission section 17 may change the transmission path for transmitting an error correction data unit to another transmission path for each predetermined time interval. In other word, the error correction data units are transmitted through different transmission path at a predetermined time interval in a path hopping manner.

The predetermined time interval may be, for example, time required for transmission of a single data unit, or a time required for transmission of a single aggregated data unit. Alternatively, the predetermined time interval may be, for example, a time required for transmission of plural data units, or a time required for transmission of plural aggregated data units.

In addition, the transmission section 17 may transmit an error correction data unit through plural transmission paths. To be more concrete, the transmission path for transmitting an error correction data unit may include a transmission path for transmitting an error correction data unit including first error correction data and a transmission path for transmitting an error correction data unit including second error correction data.

The first error correction data is generated in a method different from a method for generating the second error correction data. The first error correction data may be, for example, exclusive OR (vertical parity data) of bits forming two or more streams of user data units. The second error correction data may be, for example, exclusive OR (horizontal parity data) of bits forming two or more streams of user data units.

(Message Format)

Figure 3:
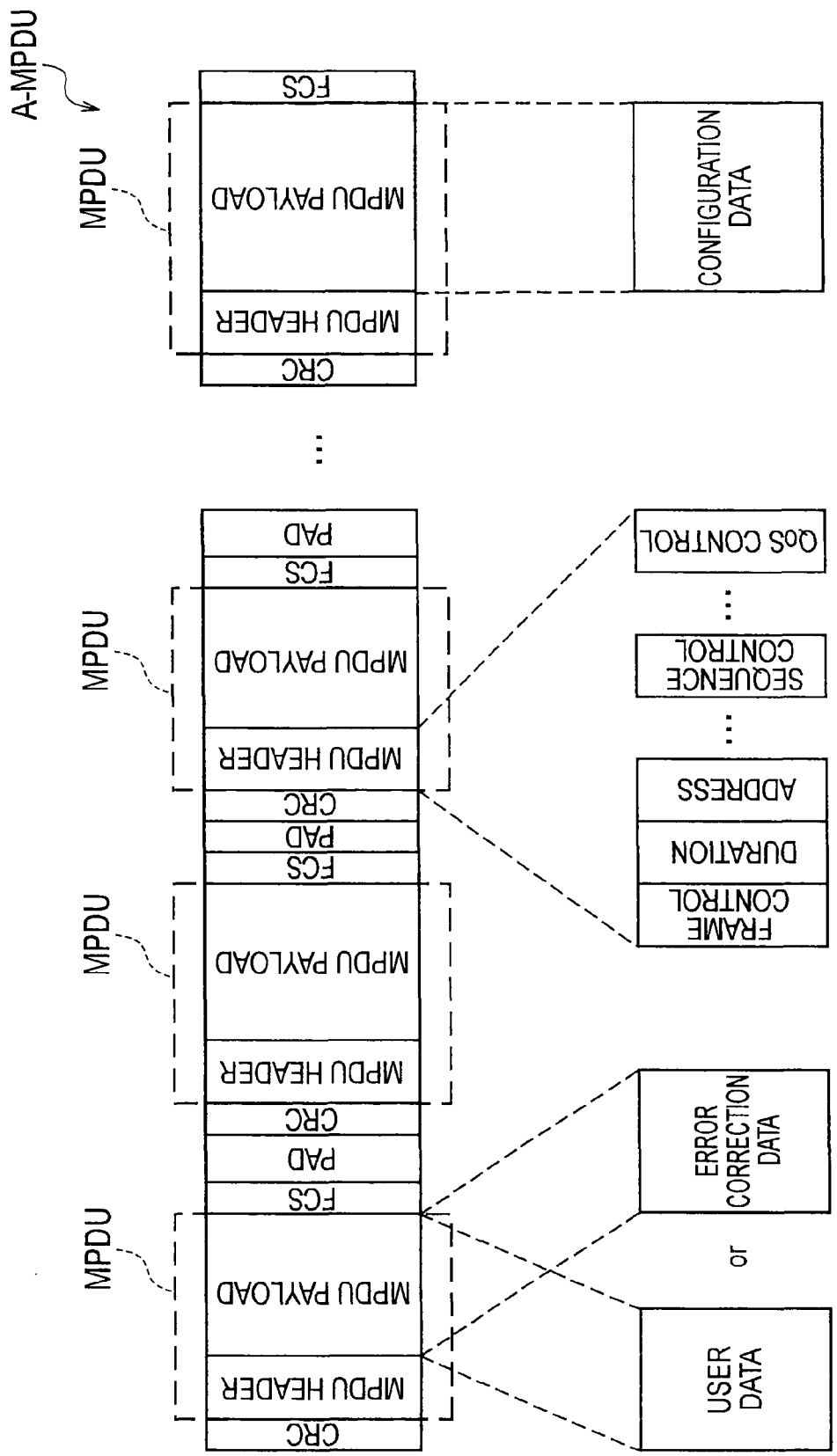
FIG. 3 shows a message format according to the first embodiment.

Hereinafter, a description will be given to a message format according to the first embodiment with reference to the drawing. FIG. 3 shows the message format according to the first embodiment. Here, FIG. 3 exemplifies MPDUs as data units (user data unit or error correcting unit) and also exemplifies an A-MPDU as an aggregated data unit.

As shown in FIG. 3, an A-MPDU is formed of plural MPDUs. The A-MPDU includes a cyclic redundancy check (CRC), an MPDU header, an MPDU payload, a frame check sequence (FCS) and a padding data (PAD). The CRC, the MPDU header, the MPDU payload, the FCS and the PAD form a single frame.

The CRC (Cyclic Redundancy Check) is a bit string used for error detection of a single frame.

The MPDU header is the header of an MPDU. The MPDU header includes frame control, duration, an address, sequence control, QoS control and the like. The frame control is a field indicating the structure of a subframe included in the MPDU payload. The duration is a field indicating an estimated time required for transmitting the MPDU. The address is a field indicating the destination of the MPDU. The sequence control is a field indicating the sequence of the MPDUs. The QoS control is a field indicating the quality required for the MPDU.

The MPDU payload includes user data or error correction data. In the case where the A-MPDU includes user data units, for example, the MPDU payload includes user data. In the case where the A-MPDU includes an error correction data unit, the MPDU payload includes error correction data.

The FCS is a bit string used for error detection and error correction of a single frame.

The PAD is a bit string for adjusting the data length of data included in a single frame. The PAD is a bit string used for adjusting lack of data so that the single frame consists of an integral number of bytes, for example.

Here, it should be noted that the MPDU payload of one of the plural MPDUs forming an A-MPDU includes the configuration data in the first embodiment. Note that, the configuration data may be included in the MPDU payloads of plural MPDUs.

(First Data Transmission Example)

Figure 4:
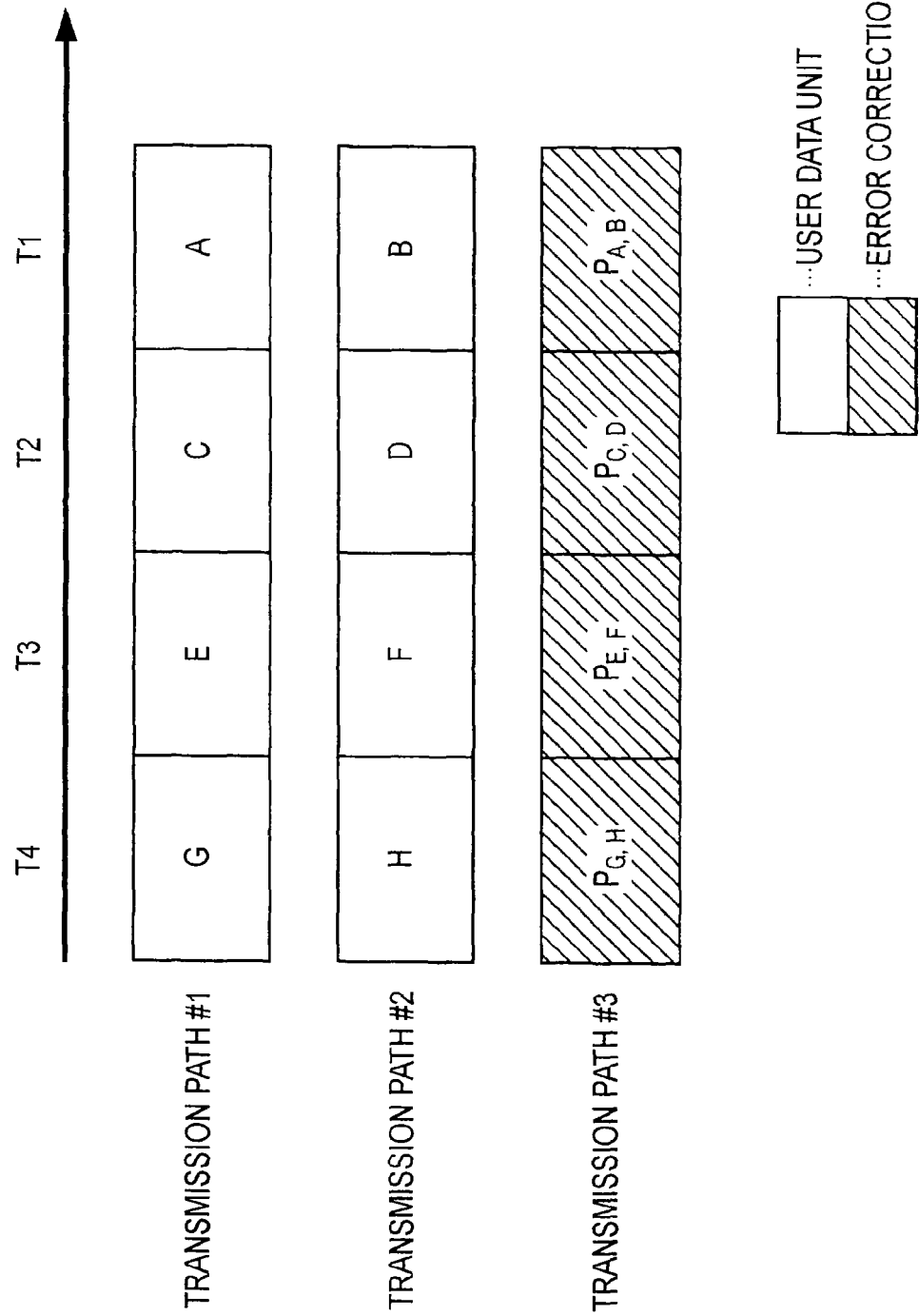
FIG. 4 shows a first data transmission example according to the first embodiment.

Hereinafter, a description will be given to a first data transmission example according to the first embodiment with reference to the drawing. FIG. 4 shows the first data transmission example according to the first embodiment. Here, three transmission paths (transmission path #1 to transmission path #3) are established for the single receiving apparatus 20.

The transmission path #1 and the transmission path #2 are used for transmitting user data units. The transmission path #3 is used for transmitting an error correction data unit. In the first data transmission example, the transmission path for transmitting an error correction data unit is unchanged and fixed over unit time periods.

In a predetermined time interval T1, for example, a user data unit A is transmitted through the transmission path #1, and a user data unit B is transmitted through the transmission path #2. Meanwhile, an error correction data unit $P_{A, B}$ is transmitted through the transmission path #3. The error correction data unit $P_{A, B}$ includes exclusive OR (parity data) of the user data unit A and the user data unit B, for example.

(Second Data Transmission Example)

Figure 5:
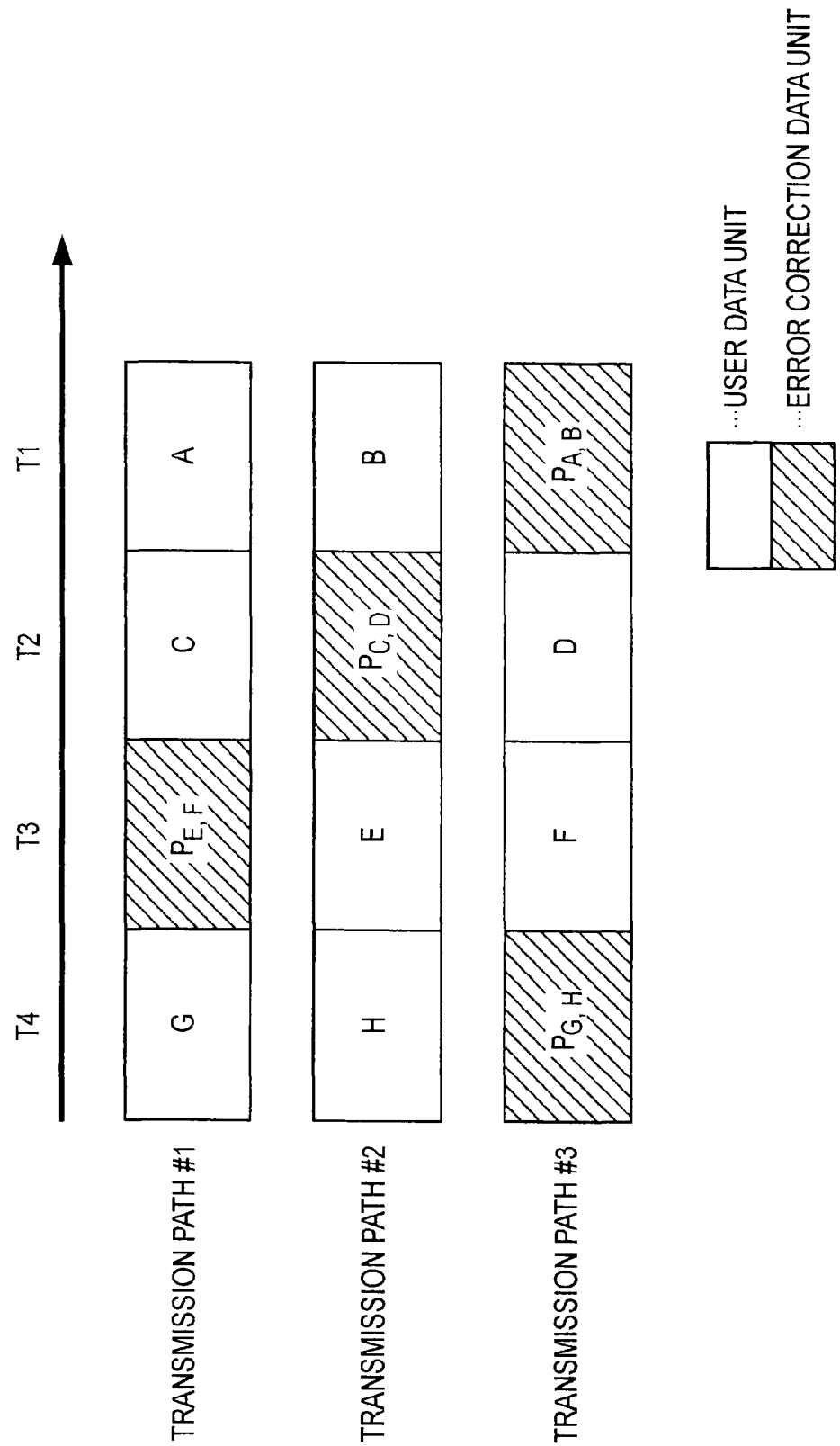
FIG. 5 shows a second data transmission example according to the first embodiment.

Hereinafter, a description will be given to a second data transmission example according to the first embodiment with reference to the drawing. FIG. 5 shows the second data transmission example according to the first embodiment. Here, three transmission paths (transmission path #1 to transmission path #3) are established for the single receiving apparatus 20.

The transmission paths #1 to #3 are used for transmitting user data units or an error correction data unit. In the second data transmission example, the transmission path for transmitting an error correction data unit is changed for each unit time period.

In a predetermined time interval T1, for example, an error correction data unit $P_{A,B}$ is transmitted through the transmission path #3. In a predetermined time interval T2, an error correction data unit $P_{C,D}$ is transmitted through the transmission path #2. In a predetermined time interval T3, an error correction data unit $P_{E,F}$ is transmitted through the transmission path #1.

(Third Data Transmission Example)

Figure 6:
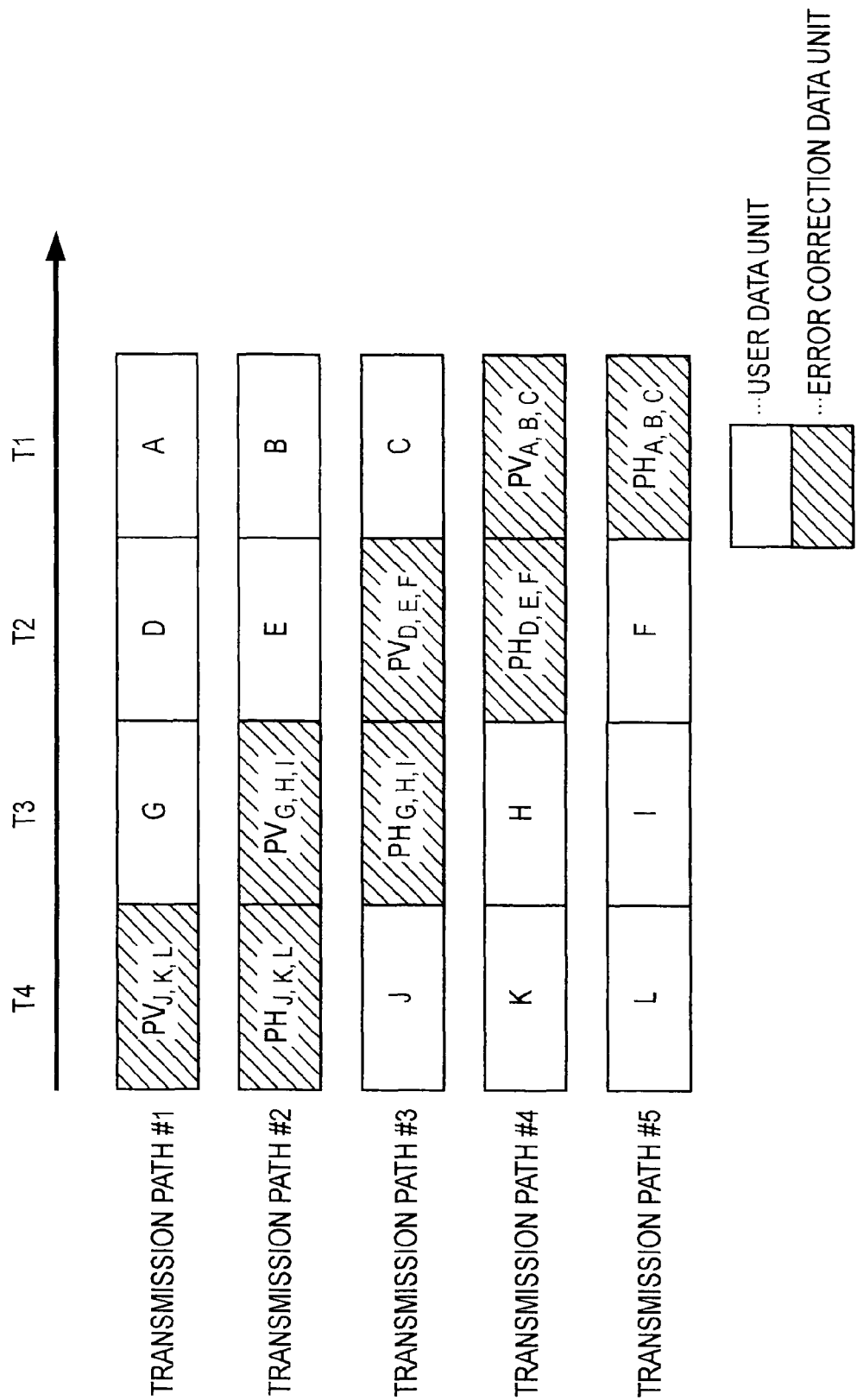
FIG. 6 shows a third data transmission example according to the first embodiment.
Figure 7:
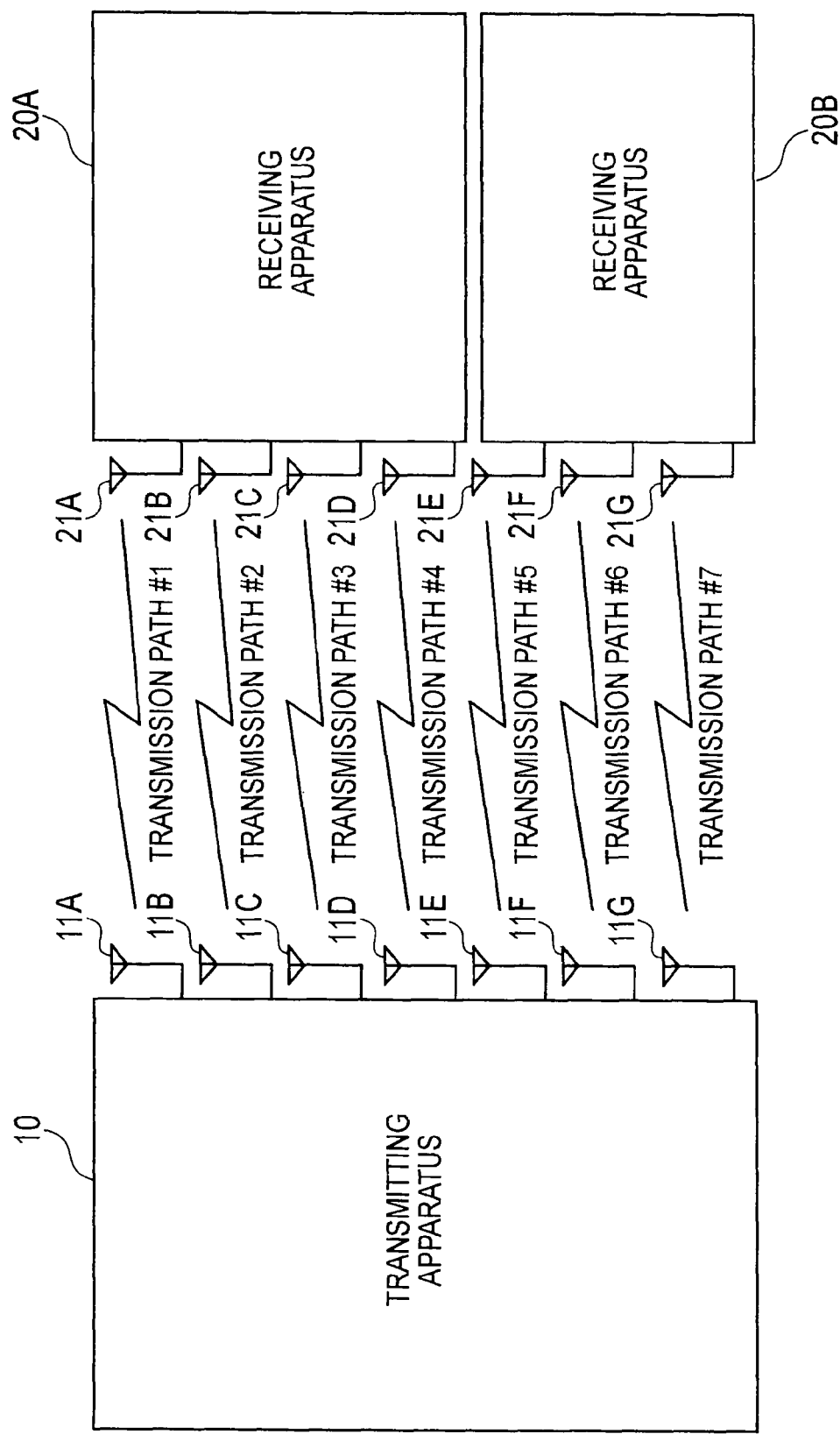
FIG. 7 shows a configuration of a network according to a first modification.

Hereinafter, a description will be given to a third data transmission example according to the first embodiment with reference to the drawing. FIG. 6 shows the third data transmission example according to the first embodiment. Here, five transmission paths (transmission path #1 to transmission path #5) are established for the single receiving apparatus 20.

The transmission paths #1 to #5 are used for transmitting user data units or an error correction data unit. In the third data transmission example, the transmission path for transmitting an error correction data unit is variable as in the second data transmission example. To be more concrete, the error correction data units are transmitted through different transmission paths as in the second data transmission example.

Two transmission paths are used for transmitting an error correction data unit in the third data transmission example.

For example, in a predetermined time interval T1, an error correction data unit $PV_{A,B,C}$ is transmitted through the transmission path #4 and an error correction data unit $PH_{A,B,C}$ is transmitted through the transmission path #5.

The error correction data unit $PV_{A,B,C}$ includes exclusive OR (first error correction data) of the user data unit A and the user data unit B, for example. The error correction data unit $PH_{A,B,C}$ includes exclusive OR (second error correction data) of the user data unit A and the user data unit B, for example.

It should be noted that the first error correction data is generated in a method different from a method for generating the second error correction data. For example, the first error correction data is vertical parity data and the second error correction data is horizontal parity data.

MODIFICATION EXAMPLE 1

Hereinafter, a description will be given to a configuration of a network according to a first modification of the first embodiment with reference to the drawing. The description will be mainly given to a difference from the first embodiment below.

In the first modification, a transmitting apparatus 10 transmits user data to plural receiving apparatuses 20 (here, receiving apparatuses 20A and 20B). Note that, the transmitting apparatus 10 has plural antennas 11 (antennas 11A to 11G). The receiving apparatus 20A has plural antennas 21 (antennas 21A to 21D). The receiving apparatus 20B has plural antennas 21 (antennas 21E to 21G).

Between the transmitting apparatus 10 and the receiving apparatus 20A, a transmission path #1 is established between the antenna 11A and the antenna 21A, a transmission path #2 is established between the antenna 11B and the antenna 21B, a transmission path #3 is established between the antenna 11C and the antenna 21C, and a transmission path #4 is established between the antenna 11D and the antenna 21D, for example. Between the transmitting apparatus 10 and the receiving apparatus 20B, a transmission path #5 is established between the antenna 11E and the antenna 21E, a transmission path #6 is established between the antenna 11F and the antenna 21F, and a transmission path #7 is established between the antenna 11G and the antenna 21G.

Here, the transmitting apparatus 10 transmits user data to the receiving apparatus 20A by use of the transmission path #1 to the transmission path #4 in the aforementioned first data transmission example to the third data transmission example. In addition, the transmitting apparatus 10 transmits user data to the receiving apparatus 20B by use of the transmission path #5 to the transmission path #7 in the aforementioned first data transmission example to the third data transmission example.

The data transmission method (error correction data transmission method) applied to the user data transmitted to the receiving apparatus 20A may be different from the data transmission method (error correction data transmission method) applied to the user data transmitted to the receiving apparatus 20B.

As described above, the transmitting apparatus 10 may transmit user data to the plural receiving apparatuses 20. In addition, the number of transmission paths established between the transmitting apparatus 10 and each of the receiving apparatuses 20 may be different. Moreover, the data transmission methods (error correction data transmission methods) applied to the user data transmitted from the transmitting apparatus 10 to the respective receiving apparatuses 20 may be different from one another.

As described above, the details of this invention have been disclosed by using the embodiments of this invention. However, it should not be understood that the description and drawings which constitute part of this disclosure limit this invention. From this disclosure, various alternative embodiments, examples, and operation techniques will be easily found by those skilled in the art.

In the aforementioned embodiment, the description has been mainly given to the processing for the MAC layer. However, the embodiment is not limited to this case. To put it another way, the embodiment is applicable to the processing for another layer (such as the LLC layer) as well.

In this embodiment, the MPDU is exemplified as the user data unit. However, the embodiment is not limited to this case. In other words, the user data unit may be a protocol data unit of another layer (such as the LLC layer).

What is claimed is:

1. A transmitting apparatus for transmitting user data, the transmitting apparatus comprising:
   an establishing section that establishes three or more transmission paths for a receiving apparatus;
   a first generation section that generates a user data unit which includes user data to be transmitted to the receiving apparatus; and
   a second generation section that generates an error correction data unit which includes error correction data to be used for error correction of the user data to be transmitted to the receiving apparatus, wherein
   at least one of the three or more transmission paths transmits the error correction data unit,
   at least two of the three or more transmission paths transmits the user data unit the error correction data includes first error correction data to be used for error correction of the user data to be transmitted to the receiving apparatus, and second error correction data to be used for error correction of the user data to be transmitted to the receiving apparatus, the transmission path for transmitting the error correction data unit includes a transmission path for transmitting an error correction data unit including the first error correction data, and a transmission path for transmitting an error correction data unit including the second error correction data, the first error correction data is generated by a method different from a method used for generating the second error correction data, and the first and second error correction data are respectively generated from at least two streams of the user data unit.

2. The transmitting apparatus according to claim 1, further comprising a third generation section that generates an aggregated data unit which includes plural data units, wherein the aggregated data unit includes configuration data which indicates a configuration of data to be transmitted to the receiving apparatus through the three or more transmission paths.

3. The transmitting apparatus according to claim 2, wherein the aggregated data unit is transmitted with at least one of the error correction data unit and the user data unit.

4. The transmitting apparatus according to claim 1, wherein the transmission path which transmits the error correction data unit is unchanged and fixed over predetermined time intervals.

5. The transmitting apparatus according to claim 1, wherein the error correction data units are transmitted through different transmission path at a predetermined time interval in a path hopping manner.

6. The transmitting apparatus according to claim 1, wherein the establishing section establishes the three or more transmission paths for each of plural receiving apparatuses, and error correction data transmission methods applied to user data to be transmitted to the respective plural receiving apparatuses are different from one another.

7. A transmission method for transmitting user data, the method comprising:

a step A of establishing three or more transmission paths for a receiving apparatus;

a step B of generating a user data unit which is a data unit including user data to be transmitted to the receiving apparatus; and a step C of generating an error correction data unit which is a data unit including error correction data to be used for error correction of the user data to be transmitted to the receiving apparatus, wherein at least one of the three or more transmission paths is a transmission path for transmitting the error correction data unit, at least two of the three or more transmission paths are transmission paths for transmitting the user data unit the error correction data includes first error correction data to be used for error correction of the user data to be transmitted to the receiving apparatus, and second error correction data to be used for error correction of the user data to be transmitted to the receiving apparatus, the transmission path for transmitting the error correction data unit includes a transmission path for transmitting an error correction data unit including the first error correction data, and a transmission path for transmitting an error correction data unit including the second error correction data, the first error correction data is generated by a method different from a method used for generating the second error correction data, and the first and second error correction data are respectively generated from at least two streams of the user data unit.

* * * * *